United States Patent
Silva

(10) Patent No.: US 9,868,258 B2
(45) Date of Patent: Jan. 16, 2018

(54) MANUFACTURED PORTED MANDREL AND METHOD FOR MAKING SAME

(71) Applicant: Zachary S. Silva, Houston, TX (US)

(72) Inventor: Zachary S. Silva, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 534 days.

(21) Appl. No.: 14/487,709

(22) Filed: Sep. 16, 2014

(65) Prior Publication Data

US 2016/0076342 A1 Mar. 17, 2016

(51) Int. Cl.
| | |
|---|---|
| *B29C 67/00* | (2017.01) |
| *G05B 19/4099* | (2006.01) |
| *E21B 43/267* | (2006.01) |
| *B29C 64/386* | (2017.01) |
| *B33Y 50/02* | (2015.01) |

(52) U.S. Cl.
CPC ........ *B29C 67/0088* (2013.01); *B29C 64/386* (2017.08); *E21B 43/267* (2013.01); *G05B 19/4099* (2013.01); *B33Y 50/02* (2014.12); *G05B 2219/49007* (2013.01)

(58) Field of Classification Search
CPC ....................................................... E21B 17/00
USPC ........................................................ 138/177
See application file for complete search history.

(56) References Cited

U.S. PATENT DOCUMENTS

| | | | |
|---|---|---|---|
| 4,782,896 A | 11/1988 | Witten | |
| 5,505,262 A * | 4/1996 | Cobb | E21B 7/18 |
| | | | 134/198 |
| 5,636,691 A | 6/1997 | Hendrickson et al. | |
| 6,491,097 B1 | 12/2002 | Oneal et al. | |
| 9,476,286 B2 * | 10/2016 | Frosell | E21B 41/0078 |
| 2002/0125008 A1 * | 9/2002 | Wetzel | A45C 13/02 |
| | | | 166/278 |
| 2009/0242211 A1 | 10/2009 | Fagley | |
| 2011/0277999 A1 * | 11/2011 | Corre | E21B 33/127 |
| | | | 166/264 |
| 2013/0112399 A1 | 5/2013 | Royer et al. | |
| 2013/0310961 A1 | 11/2013 | Velez | |
| 2013/0316149 A1 * | 11/2013 | Atkins | E21B 10/00 |
| | | | 428/172 |
| 2014/0131031 A1 * | 5/2014 | Tingat Cody | E21B 33/12 |
| | | | 166/179 |
| 2015/0144324 A1 * | 5/2015 | Mueller | E21B 17/003 |
| | | | 166/65.1 |
| 2016/0201425 A1 * | 7/2016 | Walton | E21B 33/134 |
| | | | 166/376 |

(Continued)

FOREIGN PATENT DOCUMENTS

WO    2010045074 A2    4/2010

OTHER PUBLICATIONS

Notification of Transmittal of the International Search Report and the Written Opinion of the International Searching Authority, or the Declaration; PCT/US2015/049953; dated Dec. 18, 2015; 10 pages.

*Primary Examiner* — Robert E Fuller
(74) *Attorney, Agent, or Firm* — Cantor Colburn LLP

(57) ABSTRACT

A ported mandrel additively manufactured with at least two different materials. A unitary ported mandrel includes a mandrel body of a base material; one or more ports including an erosion resistant material; and one or more return pathways. A method for making a unitary ported mandrel for a downhole fracturing operation.

7 Claims, 5 Drawing Sheets

(56) References Cited

U.S. PATENT DOCUMENTS

2016/0258256 A1* 9/2016 Nguyen ................ E21B 43/088

* cited by examiner

MANUFACTURED PORTED MANDREL AND METHOD FOR MAKING SAME

BACKGROUND

Fracturing operations in the downhole industry for production of fluids and/or sequestration of Carbon Dioxide commonly utilize one or more ported mandrels through which high pressure fracturing fluid and proppant is applied to a formation face that defines a borehole in which the fracturing operations are to take place. The high pressure fluid is employed to induce fractures in the formation beyond the formation face and proppant is employed to maintain these fractures following the removal of pressure on the formation, thereby enhancing permeability of the formation to promote fluid movement there through.

As the fracturing industry advances, higher pressures, greater rates of fluid flow, and larger proppant volumes are being employed. This is inevitably accompanied by exacerbated erosion of critical parts of the ported mandrels at least. Erosion is a consistent engineering concern in any fluid flow system, but with the higher rates and larger proppant volumes noted, the increased rate of erosion can make the subject activities excessively costly due to accelerated scrap and redress requirements.

Relatedly, fluid dynamic studies and the ever growing body of information surrounding such studies, suggest that uncommon geometries for ported mandrels could reduce the rate of erosion brought on by these more demanding applications. Some of the possible configurations that could be developed are difficult, or even impossible, to effectively machine thereby rendering their pursuit commercially unattainable.

In view of the foregoing drawbacks, the art is ever receptive to solutions that can overcome shortcomings of the prior art.

SUMMARY

A ported mandrel additively manufactured with at least two different materials.

A unitary ported mandrel includes a mandrel body of a base material; one or more ports including an erosion resistant material; and one or more return pathways.

A method for making a unitary ported mandrel for a downhole fracturing operation includes determining a layout of ports, return pathways and areas requiring erosion resistance; inputting the foregoing into a computer controller for an additive manufacturing device; and forming the ported mandrel.

A method for making a unitary ported mandrel for a downhole fracturing operation includes positioning a layer of material according to a programmed configuration of the unitary ported mandrel; positioning another layer of material at least partially in contact with the layer of material; repeating the positioning of a layer and positioning of another layer including positioning layers of erosion resistant material in selected locations until the unitary ported mandrel is complete.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
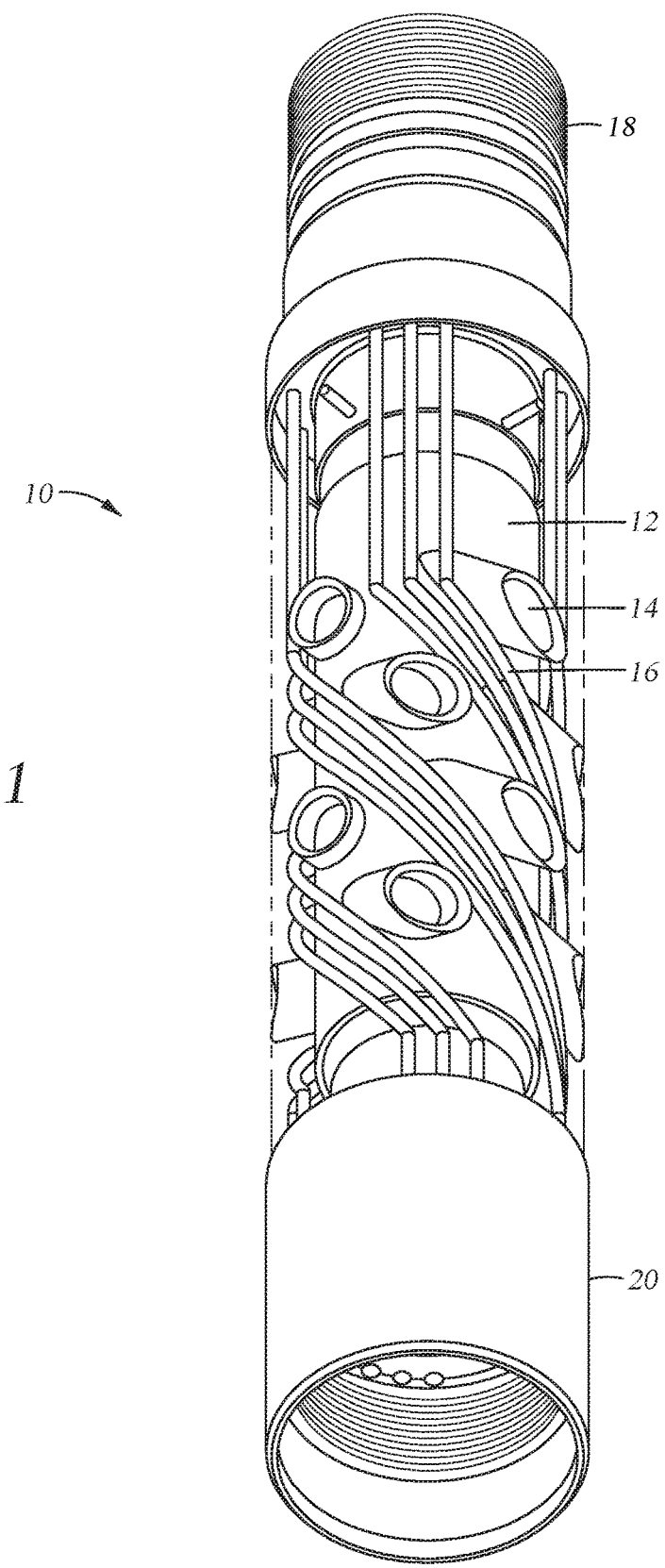
FIG. 1 is a perspective partially transparent view of a ported mandrel as disclosed herein.
Figure 2:
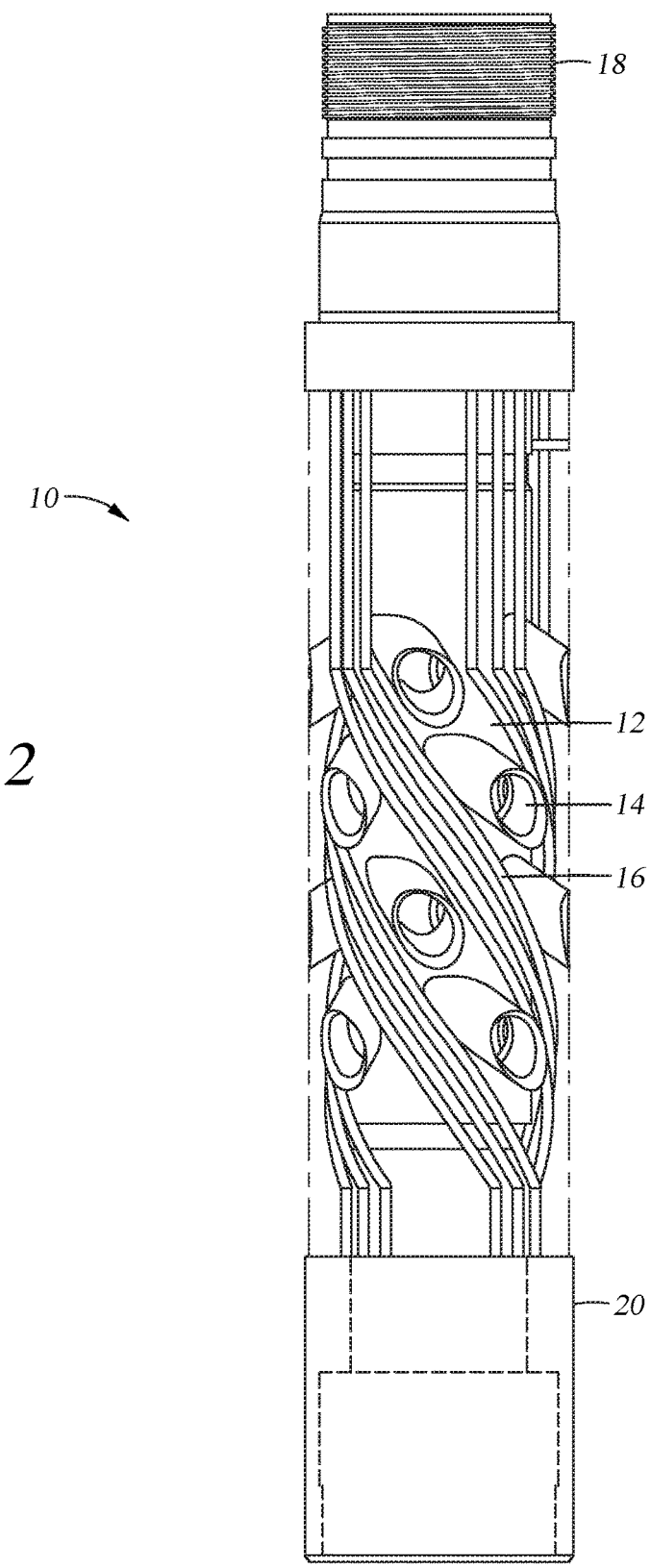
FIG. 2 is a side partially transparent view of the mandrel of FIG. 1.

Referring to FIGS. 1 and 2, a perspective partially transparent view and a side partially transparent view of an additively manufactured ported mandrel 10 are illustrated. The mandrel 10 includes a mandrel body 12, a number of ports 14 and a number of return flow paths 16. Further the mandrel 10 comprises ends 18 and 20 that may be configured as desired to connect with other components of a downhole string (not shown). It will be immediately apparent to one of skill in the art that the mandrel layout is unique. More specifically, the pattern of ports 14 and return flow paths is helical. Further, the ports 14 themselves are provided with a highly erosion resistant material such as carbide. The ports may have a portion thereof coated with erosion resistant material or made of erosion resistant material or the whole port may be made of erosion resistant material. The accomplishment of both of these unique features is supported through the use of additive manufacturing methods. More specifically, additive manufacture is a process whereby individual layers of material are built upon one another until a final product is achieved. This is layer-by-layer or even molecule-by-molecule. Because of the ability to form the final product from one side and effectively move a computer controlled cross section through the part being produced, otherwise physically difficult or impossible to produce geometries are enabled. In the present invention, a process such as Direct Metal Laser Sintering (DMLS) may be used to create a mandrel as depicted with carbon steel in some places that are not particularly subject to erosion and carbide in areas that are particularly subject to erosion as determined through actual visual examination of used parts or by computer modeling. The material difference allows for cost control and material property control to optimize a particular mandrel for a particular deployment. Importantly, the distinct materials are not distinct parts connected to the other parts of the mandrel. Rather the mandrel body, ports and return pathways including the base material and the erosion resistant materials as disclosed is a unitary ported mandrel. The mandrel is a single formed piece at the end of the additive machining process without any additional components needed to complete the mandrel itself.

Figure 3:
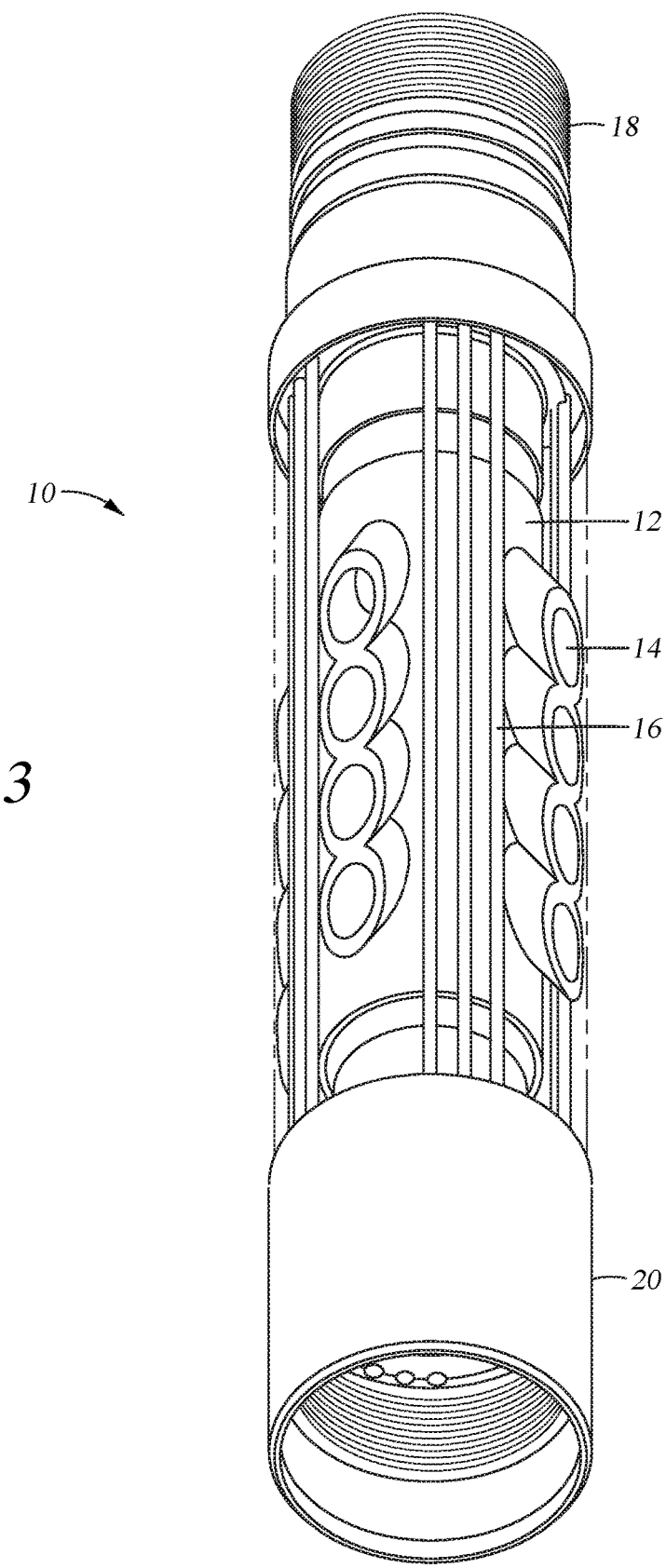
FIG. 3 is a perspective partially transparent view of an alternate embodiment of a ported mandrel as disclosed herein.
Figure 4:
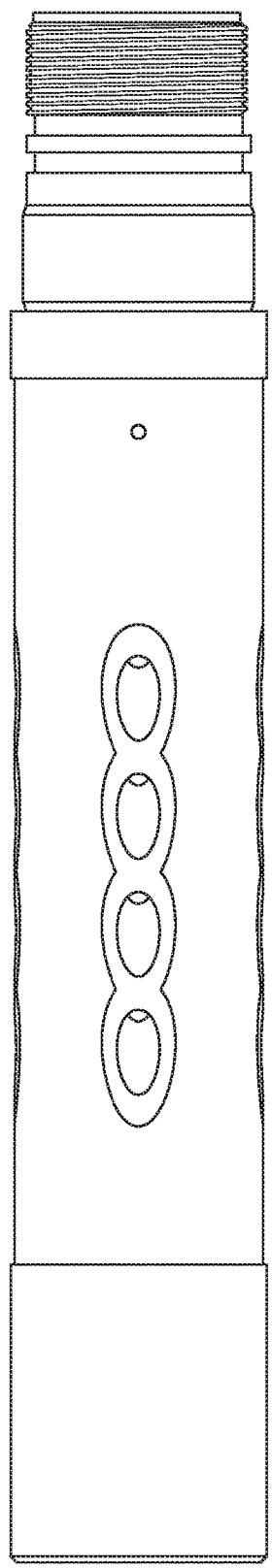
FIG. 4 is a side view of the embodiment of FIG. 3.
Figure 5:
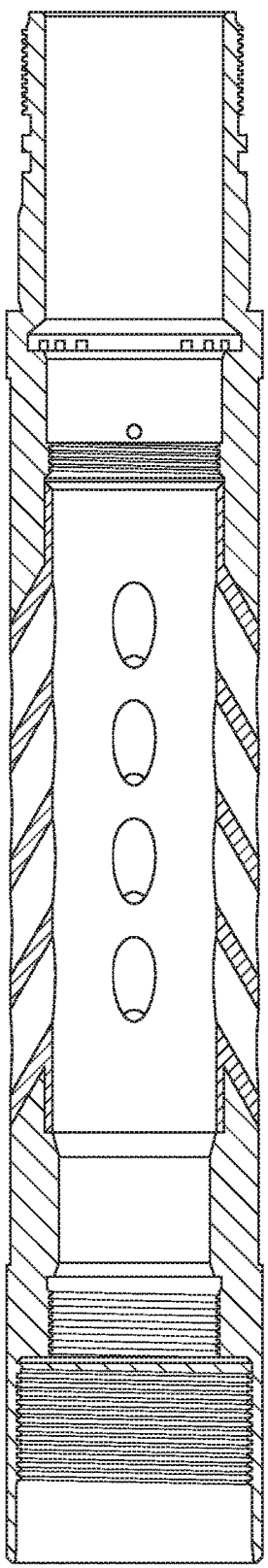
FIG. 5 is a cross-sectional view of the embodiment of FIG. 3.

Referring to FIG. 3, a more conventional geometry is created using the additive machining method to improve simplicity of protecting areas subject to erosion. Instead of laborious prior art methods of producing matching sets of carbide port inserts, the ports are either made from carbide or coated at appropriate locations during the additive machining process.

For either embodiment disclosed, the longitudinal ends of the mandrel 10 will be configured for connection (such as, for example only, pin and box threads) with other components of a string to be run downhole for a fracturing operation.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A unitary single piece ported mandrel comprising:
   a mandrel body of a base material, the mandrel body including one of a box thread and a pin thread:
   one or more ports including an erosion resistant material providing a fluid pathway from an inside diameter of the mandrel to an area around an outside diameter of the mandrel; and
   one or more return pathways arranged helically about the mandrel and enclosed within a wall thickness of the mandrel and configured to move fluid longitudinally of the mandrel to adjacent structure.

2. The unitary ported mandrel as claimed in claim 1 wherein the one or more ports is greater than one and the ports are arranged helically with respect to a longitudinal axis of the mandrel body.

3. The unitary ported mandrel as claimed in claim 1 wherein the one or more ports are coated with the erosion resistant material.

4. The unitary ported mandrel as claimed in claim 1 wherein the erosion resistant material is carbide.

5. The unitary ported mandrel as claimed in claim 1 wherein the base material is carbon steel.

6. A method for making a unitary ported mandrel as claimed in claim 1, comprising:
   determining a layout of the ports, the return pathways and areas requiring erosion resistance;
   inputting the foregoing into a computer controller for an additive manufacturing device; and
   forming the ported mandrel.

7. A method for making a unitary ported mandrel as claimed in claim 1, comprising:
   positioning a layer of material according to a programmed configuration of the unitary ported mandrel;
   positioning another layer of material at least partially in contact with the layer of material;
   repeating the positioning of a layer and positioning of another layer including positioning layers of erosion resistant material in selected locations until the unitary ported mandrel is complete.

* * * * *